(12) United States Patent
Burgdorf et al.

(10) Patent No.: US 6,579,073 B1
(45) Date of Patent: Jun. 17, 2003

(54) MOTOR-PUMP ASSEMBLY

(75) Inventors: Jochen Burgdorf, Offenbach (DE); Dieter Dinkel, Eppstein (DE); Hans-Dieter Reinartz, Frank am Main (DE)

(73) Assignee: Continental Teves Ag & Co. OHG, Frankfurt (DE)

( * ) Notice: Subject to any disclaimer, the term of this patent is extended or adjusted under 35 U.S.C. 154(b) by 0 days.

(21) Appl. No.: 09/786,476

(22) PCT Filed: Aug. 26, 1999

(86) PCT No.: PCT/EP99/06278

§ 371 (c)(1),
(2), (4) Date: Aug. 1, 2001

(87) PCT Pub. No.: WO00/13951

PCT Pub. Date: Mar. 16, 2000

(30) Foreign Application Priority Data

Sep. 2, 1998 (DE) .......................................... 198 40 048

(51) Int. Cl.$^7$ ............................. F04B 1/04; F04B 19/00
(52) U.S. Cl. ......................... 417/273; 417/470; 91/491; 92/72
(58) Field of Search ................................ 417/273, 470; 91/491; 92/72; 74/589

(56) References Cited

U.S. PATENT DOCUMENTS

| 4,861,234 A | * | 8/1989 | Joy et al. .................... 417/273 |
|---|---|---|---|
| 5,348,382 A | * | 9/1994 | Ebaugh et al. ............ 303/116.4 |
| 5,564,909 A | * | 10/1996 | Rischen et al. ............. 417/273 |
| 6,158,326 A | * | 12/2000 | Burgdorf et al. ............ 417/415 |
| 6,220,760 B1 | * | 4/2001 | Ruoff et al. ................. 384/447 |

FOREIGN PATENT DOCUMENTS

| DE | 44 30 909 | 3/1996 |
|---|---|---|
| DE | 196 32 167 | 2/1998 |
| EP | 0 566 067 | 10/1993 |
| EP | 0 699 836 | 3/1996 |
| JP | 06 002649 | 1/1994 |
| JP | 06 185454 | 7/1994 |
| WO | 90 03520 | 4/1990 |
| WO | 94 10469 | 5/1994 |

* cited by examiner

Primary Examiner—Charles G. Freay
Assistant Examiner—Michael K. Gray
(74) Attorney, Agent, or Firm—Rader, Fishman & Grauer PLLC

(57) ABSTRACT

The present invention relates to a motor-and-pump assembly including an electric motor and a piston pump, in particular for slip-controlled brake systems of automotive vehicles, wherein pistons of the pump are adapted to be driven by way of an eccentric, and the drive shaft of the electric motor and a support axle of the piston pump are separately designed, and wherein a three-ring bearing furnished with an eccentric intermediate ring is arranged on the support axle. According to the present invention, at least one counterbalance weight is provided in the proximity of the eccentric for the purpose of noise reduction and enhanced truth of running of the assembly.

6 Claims, 5 Drawing Sheets

MOTOR-PUMP ASSEMBLY

TECHNICAL FIELD

The present invention generally relates to motor and pump assemblies and more particularly relates to a motor-and-pump assembly having reduced vibration characteristics.

BACKGROUND OF THE INVENTION

German published patent application DE 196 32 167 A1 discloses a generic assembly which comprises an electric motor and a piston pump that are appropriate e.g. for use in an ABS (anti-lock system), TCS (traction slip control) or ESP (Electronic Stability Program) system of a controlled vehicle brake, and pistons of the pump are drivable by way of an eccentric. In this publication, a drive shaft of the electric motor and a support axle of the piston pump have a separate design. Further, a three-ring bearing having an eccentric intermediate ring is arranged on the support axle. However, the eccentric intermediate ring has an uneven mass distribution so that an unbalance will occur when an eccentric of this type is used in a motor-and-pump assembly. The unbalance will produce undesirable noises during operation and load the respective bearings and the support axle and the pump housing in which the support axle is arranged to a major degree.

In view of the above, an object of the present invention is to improve upon an assembly of the type referred to hereinabove so that simple provisions permit reducing the unbalance and, thus, achieving an enhanced quietness in operation and reduced load on the bearings or the support axle and the pump housing.

According to the p resent invention, this object is achieved in that in a generic motor-and-pump assembly, at least one counterbalance weight is additionally provided in the proximity of the eccentric.

Preferably, the counterbalance weight is connected directly to the drive shaft or by the intermediary of a sleeve.

Advantageously, the counterbalance weight may be designed integrally with the intermediate ring.

As an alternative, however, the counterbalance weight may also be connected to the intermediate ring by way of the sleeve.

Preferably, the counterbalance weight is sintered and, hence, especially easy and simple to manufacture.

DETAILED DESCRIPTION OF THE PREFERRED EMBODIMENTS

Figure 1:
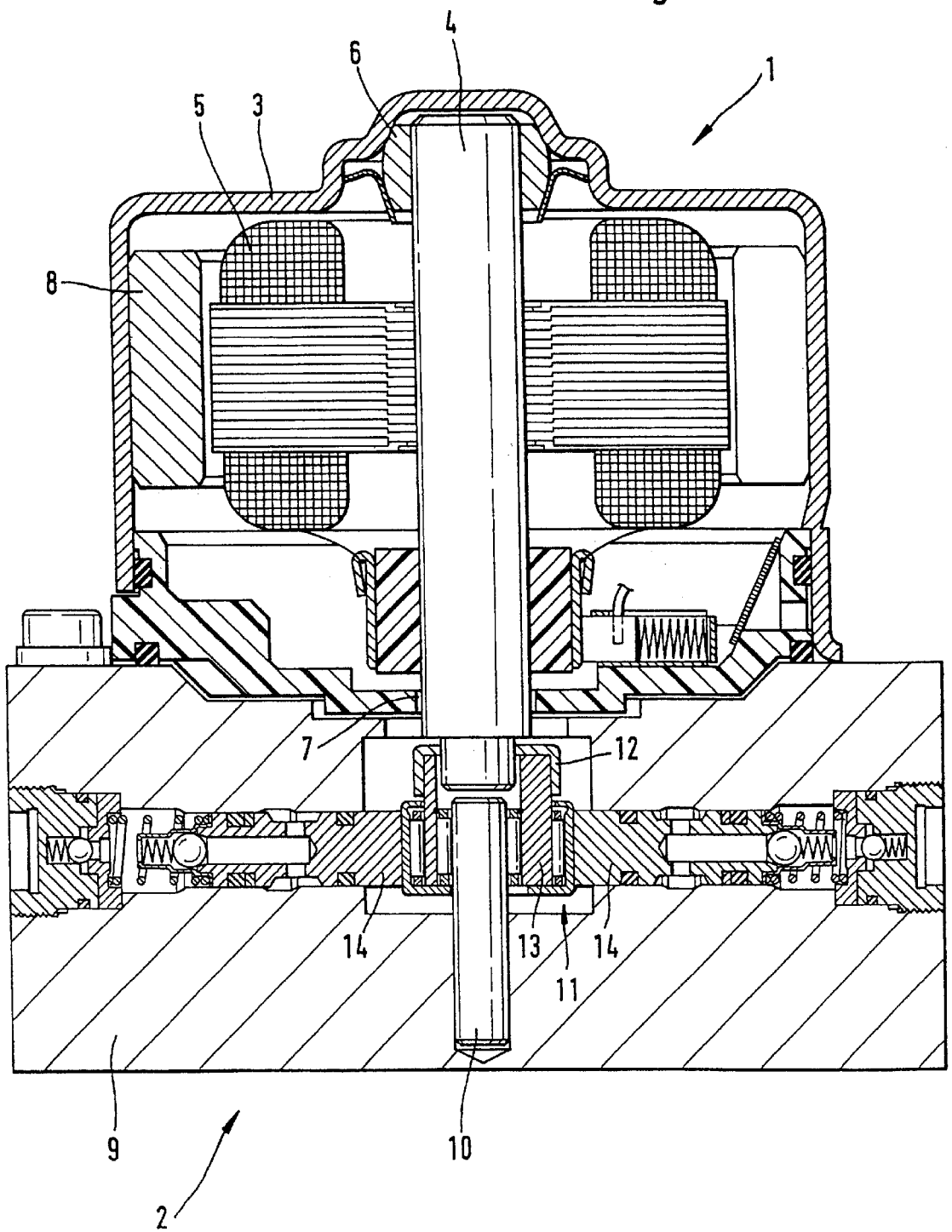
FIG. 1 is a longitudinal cross-sectional view of a motor-and-pump assembly known from the state of the art.

In the embodiment of FIG. 1 which shows a prior-art motor-and-pump assembly, an electric motor is designated by reference numeral 1 and a piston pump by reference numeral 2. In the housing 3 of the electric motor 1, a drive shaft 4 on which a rotor 5 is arranged is mounted in an upper first bearing 6 and a lower second bearing 7 so as to be rotatable relative to a stator 8. The bearings 6 and 7 are designed as sliding bearings in this example. Secured in the housing 9 of the pump 2 is a support axle 10 on which an eccentric bearing 11 is arranged. A torque transmitting sleeve 12 connected to the drive shaft 4 transmits a torque from the shaft 4 to an eccentric 13 bearing designed as an intermediate ring, whereby pistons 14 of the pump are reciprocating radially relative to the drive shaft 4 and thereby build up the pressure which is e.g. required for the operation of an ABS (anti-lock system), TSC (traction slip control) or ESP (Electronic Stability Program) system of a controlled vehicle brake. The developing reaction forces are conducted directly to the support axle 10 and, hence, into the housing 9 of the piston pump 2 by way of an outer ring 15 of the eccentric bearing 11 and needle rows.

As mentioned hereinabove, the eccentric 13 designed as intermediate ring exhibits an uneven mass distribution. Therefore, an unbalance is encountered with the use of such an eccentric 13 or eccentric bearing 11 in a motor-and-pump assembly, especially due to the large outside diameter of the eccentric 13. This unbalance causes undesirable noises in operation, and the respective bearings 6 and 7 and, in particular, the support axle 10 and the pump housing 2, in which the support axle 10 is arranged, are loaded to a very great degree.

The embodiments of the present invention illustrated in FIGS. 2 to 5 relate to an above-described motor-and-pump assembly so that in each case the description of FIG. 1 in its full contents is referred to. Like reference numerals describe identical or at least similar components.

Figure 2:
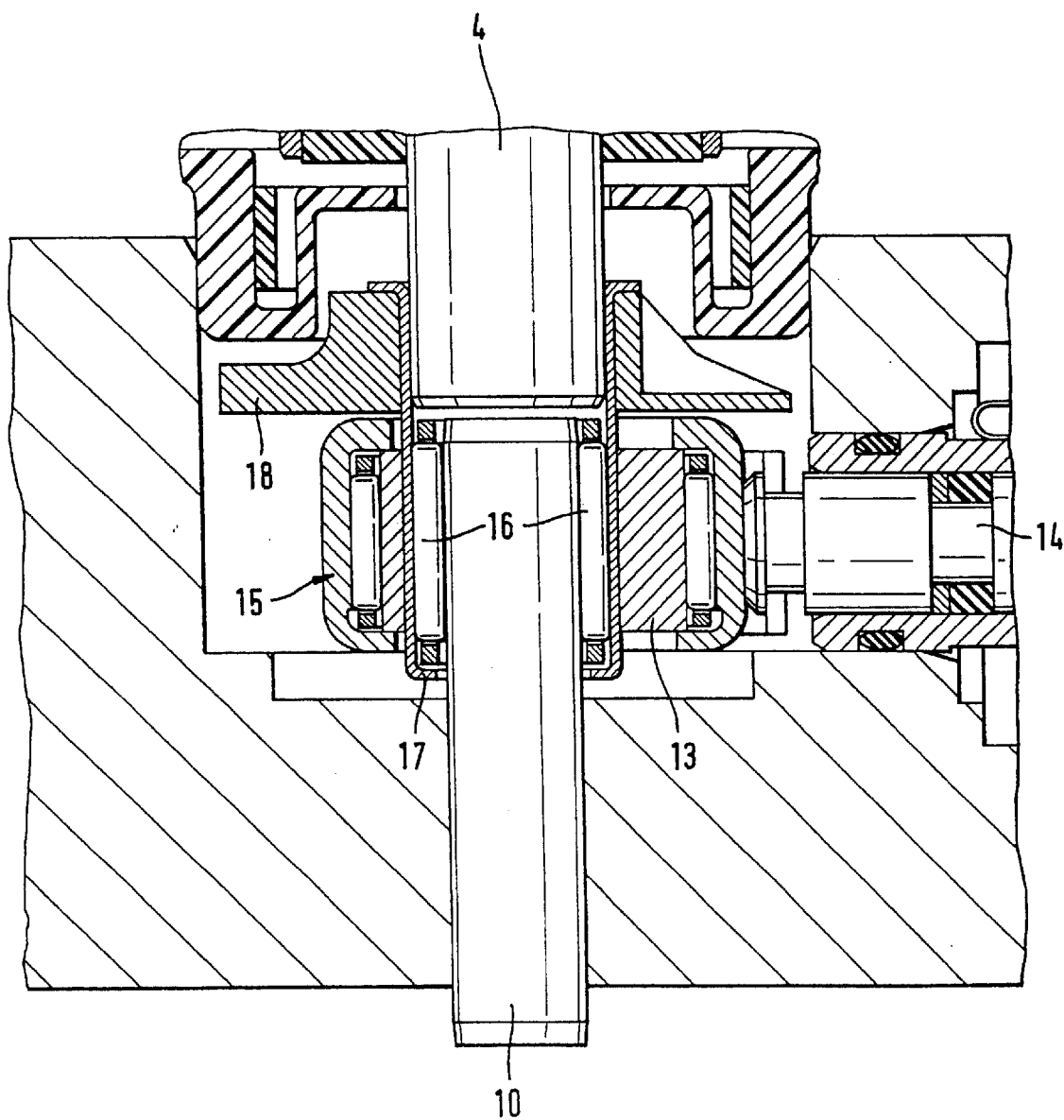
FIG. 2 is a sectional view of a first embodiment of the assembly of the present invention.

FIG. 2 shows a first embodiment of the present invention wherein a counterbalance weight 18 for compensation of the unbalance produced by the eccentric 13 designed as intermediate ring is arranged close to the eccentric 13. This ensures both a dynamic and a static balancing with a high quality. The eccentric 13 has a simple design, i.e., without special projections, extensions, etc. An outer ring 15 which represents a counterbearing for the pistons 14 is moved on the eccentric 13 by way of outside needles. Inside needles 16 of the eccentric bearing 11 move on the inside on the support axle 10 and on the outside surface in a sleeve 17 which is preferably made by drawing or deepdrawing. The torque transmission from the drive shaft 4 is preferably done by way of press fit connections between the shaft 4 and the sleeve 17 or between the sleeve 17 and the eccentric 13. Unbalances of the bearing and the eccentric 13 are compensated by means of a counterbalance weight 18 which can be sintered in particular. Preferably, the counterbalance weight 18 is equally connected to the sleeve 17 by a press fit. This especially supports in the connection between the sleeve 17 and the drive shaft 4. The counterbalance weight 18 has preferably a simple shape and is therefore easy and inexpensive to manufacture.

Figure 3:
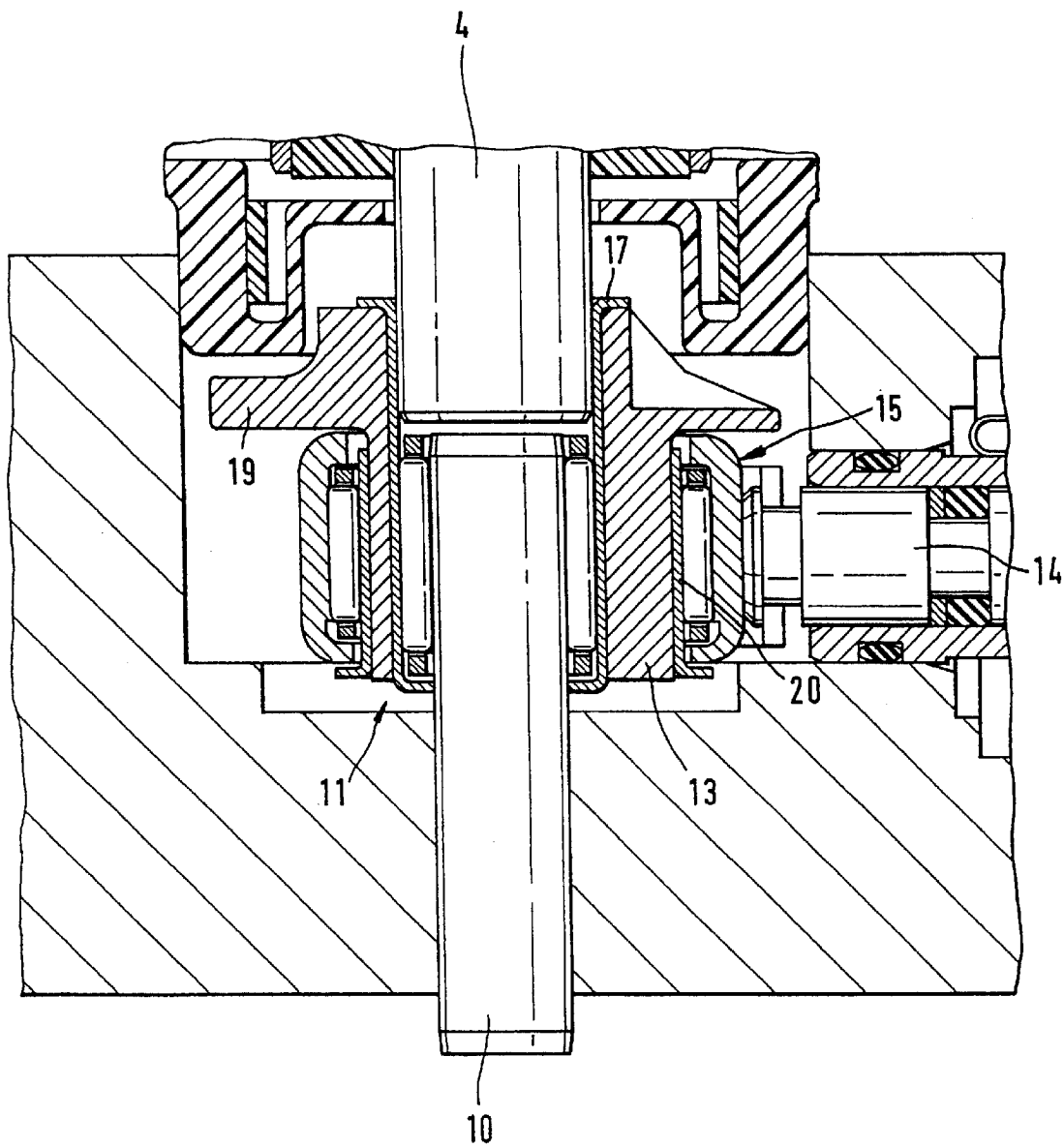
FIG. 3 is a second embodiment of the assembly of the present invention, also in cross-section.

FIG. 3 shows a second embodiment of the present invention in cross-section. In this embodiment, the counterbalance weight 19 is integrally designed with the eccentric 13 designed as intermediate ring. Beside the sleeve 17 which has already been mentioned with respect to FIG. 2, there is another sleeve 20 on which the outer ring 15 or the eccentric bearing 11 is moved. Further sleeve 20 is advantageously press fitted on the eccentric 13. In this arrangement, sleeve 20 on one end may be provided with a projection so that it additionally fixes the eccentric bearing 15 in an axial direction relative to the drive shaft 4 or the support axle 10.

Figure 4:
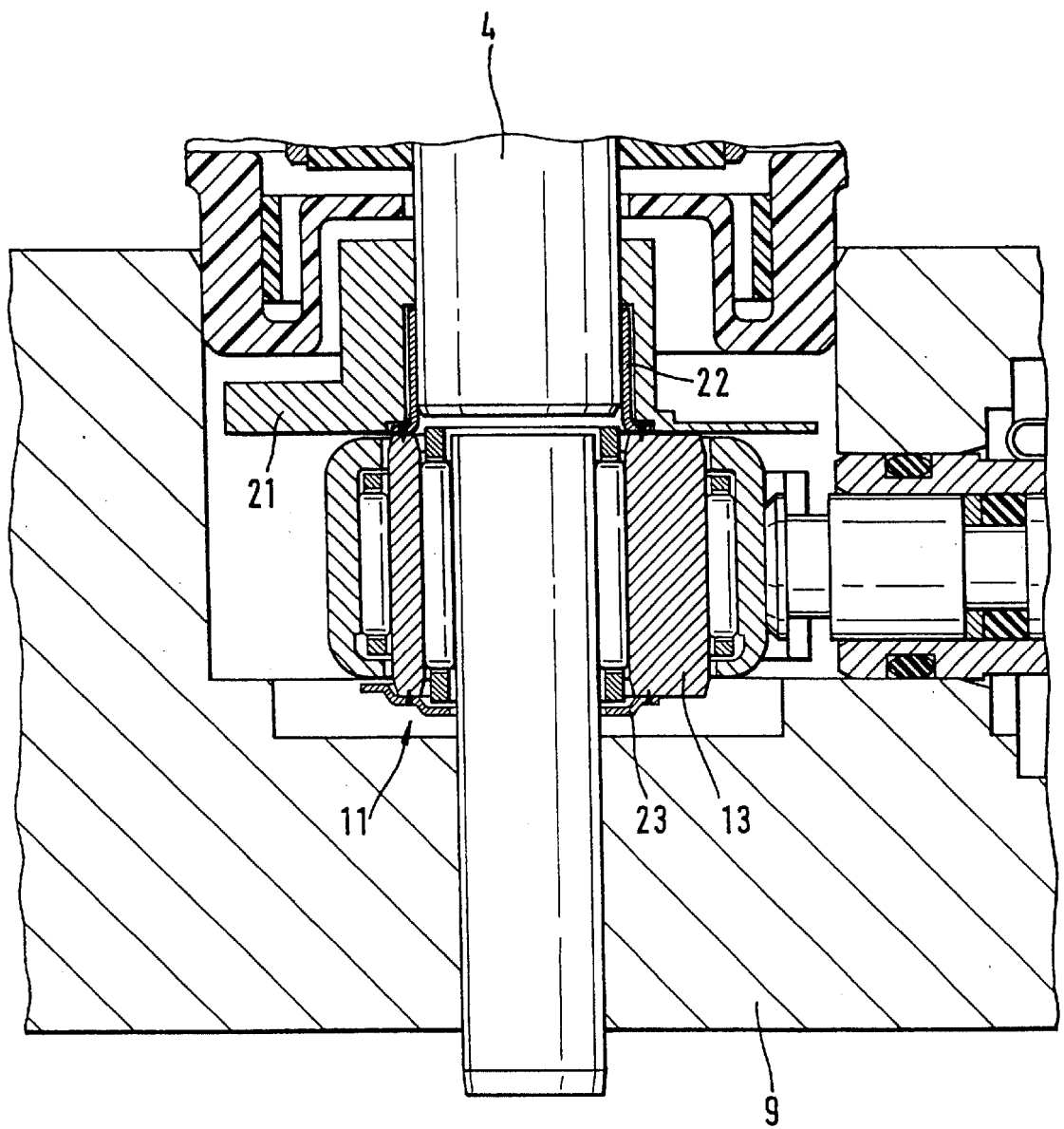
FIG. 4 shows a third embodiment of the assembly of the present invention.

FIG. 4 depicts a cross-section of another embodiment of the present invention. According to this invention, at least one counterbalance weight 21 is provided close to the eccentric 13 and, in this embodiment, is press fitted directly on the drive shaft 4 and, thus, advantageously, can be designed or mounted irrespective of the eccentric 13. The drive shaft 4 and the eccentric 13 designed as intermediate ring are interconnected by means of an especially welded sleeve 22 in this embodiment. The axial start of run for the inner and outer bearing of the eccentric 13 in the direction of the pump housing 9 is effected especially by the intermediary of a metal sheet 23 which is connected, preferably welded, to the intermediate ring 13. The metal sheet 23 prevents the eccentric 13 from striking against the pump housing 9 and wearing off.

Figure 5:
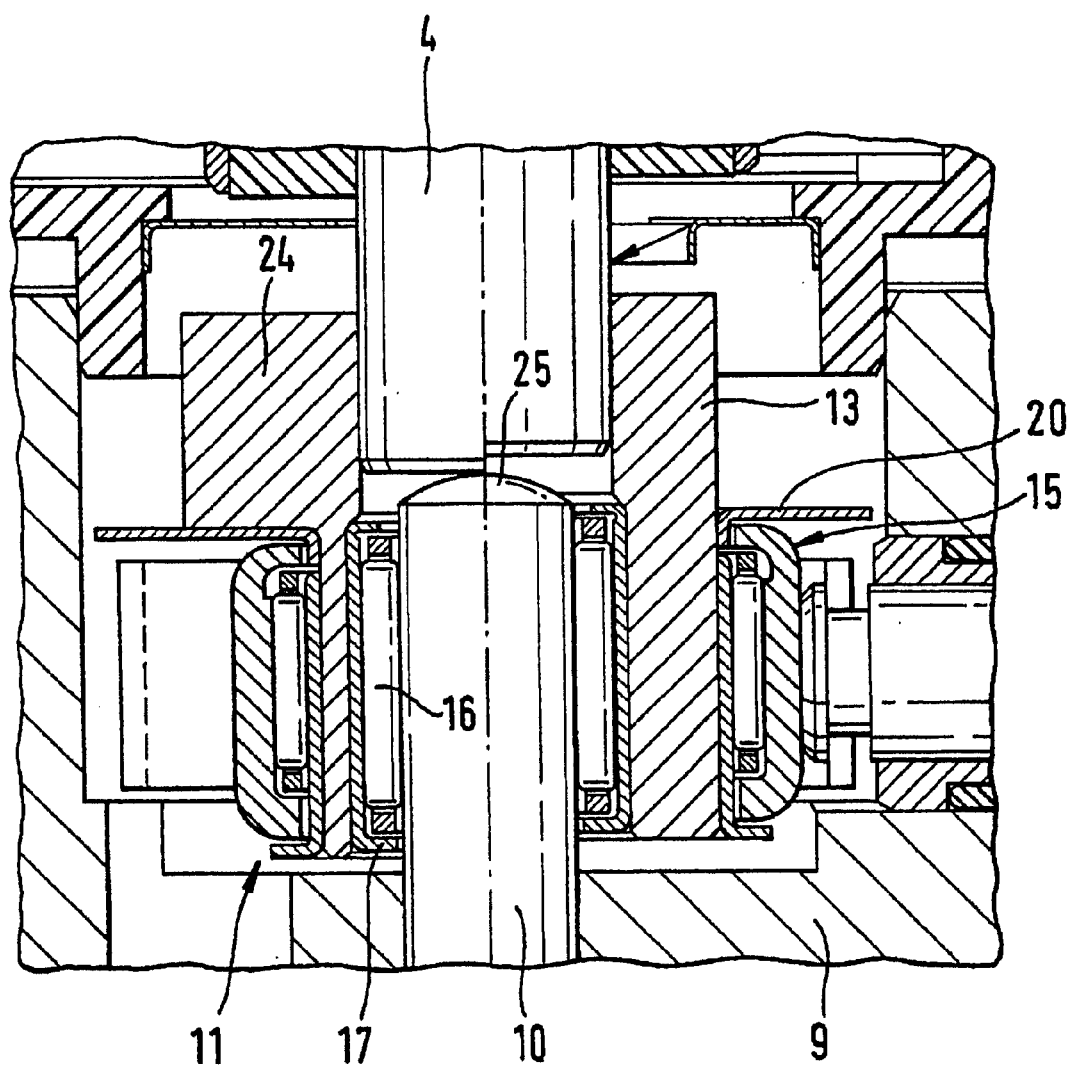
FIG. 5 shows another embodiment of the motor-and-pump assembly of the present invention.

FIG. 5 shows another and preferred embodiment of the present invention in a cross-sectional view. Similar to FIG. 3, a counterbalance weight 24 is designed integrally with the eccentric designed as intermediate ring 13. The counterbalance weight 24 has slightly less favorable properties with respect to the dynamic balancing, however, it is considerably easier to make than the counterbalance weight 19 of FIG. 3. Apart from the sleeve 17, there is another sleeve 20 on which, by way of the outside needles, the outer ring 15 or the counterbearing is moved. In this embodiment, the sleeve 20 is on both ends provided with respectively one radially outwards directed projection so that it fixes additionally the eccentric bearing 11 in an axial direction with respect to the drive shaft 4 or the support axle 10. In order to achieve greater ease of assembly of the eccentric bearing 11, the sleeve 20 in this embodiment has a bipartite design. Equally for the axial fixation of the inside needles 16, the sleeve 17 may include inwards directed projections at its ends.

Start of the electric motor 1 and, thus, of the drive shaft 4 may be followed by an axial displacement of the drive shaft 4 in the direction of the support axle 10, as is illustrated in the left-hand half of FIG. 5. To reduce the wear and the friction which is produced, the corresponding end 25 of the support axle 10 may have a rounded design. This is possible in all embodiments of the present invention.

What is claimed is:

1. Motor and pump assembly, comprising:

a motor having a drive shaft, a support axle, a torque transmitting sleeve coupled between said motor drive shaft and said support axle, an eccentric bearing coupled to said support axle, wherein an end portion of said support axle is rounded to reduce a frictional loss between said rounded end portion of said support axle and said motor drive shaft, a piston coupled to said eccentric bearing, a counter balance coupled to at least one of the motor drive shaft, torque transmitting sleeve, or said eccentric bearing.

2. The motor and pump assembly of claim 1, wherein said eccentric bearing includes an eccentric which is frictionally engaged to said torque transmitting sleeve and wherein said counter balance is directly frictionally engaged to said torque transmitting sleeve.

3. The motor and pump assembly of claim 1, wherein said counterbalance is designed integrally with an eccentric portion of said eccentric bearing.

4. The motor and pump assembly of claim 1, wherein said counter balance directly frictionally engages the drive shaft of the motor.

5. The motor and pump assembly of claim 4, wherein said counterbalance is designed integrally with an eccentric portion of said eccentric bearing and also designed integrally with said torque transmitting sleeve.

6. The motor and pump assembly of claim 1, wherein said counterbalance is fabricated from sintered material.

* * * * *